United States Patent
Lu

[19]

[11] Patent Number: 6,098,650
[45] Date of Patent: Aug. 8, 2000

[54] PRESSURE SENSING APPARATUS FOR REGULATING THE TRANSPORTATION OF A LIQUID

[75] Inventor: Chung-Chien Lu, Hsinchu, Taiwan

[73] Assignee: United Microelectronics Corp., Hsinchu, Taiwan

[21] Appl. No.: 09/116,701

[22] Filed: Jul. 16, 1998

[30] Foreign Application Priority Data

May 16, 1998 [TW] Taiwan .................... 87207634

[51] Int. Cl.⁷ ..................................... G05D 7/00
[52] U.S. Cl. ............................. 137/209; 222/397
[58] Field of Search .................. 137/209; 222/397

[56] References Cited

U.S. PATENT DOCUMENTS

| | | | |
|---|---|---|---|
| 3,461,031 | 8/1969 | Reitzel | 137/209 X |
| 4,091,249 | 5/1978 | Huffman | 200/83 P |
| 5,054,687 | 10/1991 | Burns et al. | 222/397 X |
| 5,814,151 | 9/1998 | Lee et al. | 137/209 X |
| 5,871,028 | 2/1999 | Liu | 137/209 |

*Primary Examiner*—Gerald A. Michalsky
*Attorney, Agent, or Firm*—J.C. Patents; Jiawei Huang

[57] ABSTRACT

A pressure sensing apparatus for regulating the transportation of a liquid which includes a container for containing a gas and a liquid. The container has at least four ports: the first port, used for receiving the liquid; the second port, used for exporting the liquid; the third port, used for releasing the gas; and the fourth port, the fourth opening, used for detecting and measuring internal pressure. Furthermore, the container also includes a vent hole used for venting extra gas out of the container.

8 Claims, 6 Drawing Sheets

PRESSURE SENSING APPARATUS FOR REGULATING THE TRANSPORTATION OF A LIQUID

CROSS-REFERENCE TO RELATED APPLICATION

This application claims the priority benefit of Taiwan application serial no. 87207634, filed May 16, 1998.

BACKGROUND OF THE INVENTION

1. Field of the Invention

This invention relates to a pressure sensing apparatus for regulating the flow rate of a liquid, and more particularly to a pressure switch apparatus used to detect small variances in pressure of a flowing liquid.

2. Description of Related Art

A silicon substrate used in semiconductor fabrication usually has an uneven surface, the result of the number of dielectric layers formed over the substrate to cover some structure such as a contact window or a capacitor. Semiconductor fabrication therefore, needs a planarization process to obtain an even substrate surface. Otherwise, because of the differences in relative elevation, the interconnect metal lines can not easily be formed and the precision of transferring a desired pattern onto the substrate is compromised.

Currently local planarization on the substrate surface is accomplished using spin-on glass (SOG). The SOG process includes two steps: coating and curing. SOG uses a solution that includes a dielectric material in a solvent, for spin coating onto the substrate. The dielectric material in solution fills the concave structures on the substrate to obtain a local planarization. The coating is followed by curing, which dries the residual solution of SOG out of the substrate in a thermal process that bakes the substrate, solidifying the SOG solution into a crystal structure such as $SiO_2$.

FIGS. 1A–1C are flow diagrams schematically illustrating a typical planarization process on a semiconductor substrate. Referring to FIG. 1A, three metal layers 10, 12, and 14 are formed on the substrate, the surface of which is represented by a base line in FIGS. 1A–1C. Two trenches 11 and 13 exist between the metal layers 10, 12, and 14. Referring to FIG. 1A and FIG. 1B, a silicon dioxide layer 15 is formed over the substrate partially filling trenches 11 and 13, which thus become two concave regions 16 and 17. Referring to FIG. 1B and FIG. 1C, a SOG layer 18 is formed over the silicon dioxide layer 15 completely filling concave regions 16 and 17. Following the curing to solidify the SOG, the planarization process is complete.

FIG. 2 is a plot schematically illustrating a conventional system for regulating the pressure of a flowing liquid. Referring to FIG. 2, a container 32 contains chemical solution 36 and is covered by a specialized cover 30. There are a first opening 29 and a second opening 39 on the cover 30. The first opening 29 is attached to a duct 35, onto which a pressure sensing apparatus 34 is connected. Helium gas can be pumped into the container 32 through the duct 35. A duct 27 connects the second opening 39 to a spray head 26. Therefore, the chemical solution 36 can be forced out of the container 32 through the duct 27 by pressurizing the container 32 with helium gas via the first opening 38. The chemical solution 36 follows duct 27, which includes a valve 28 to allow or inhibit the flow of the chemical solution 36. When the valve 28 is open, the chemical solution 36 flows to the spray head 26, and is sprayed on a semiconductor substrate 22, located on a rotating platform 24. To control the volume of the chemical solution 36, the pressure of the helium gas used to drive the chemical solution 36 should be kept relatively constant so that the pressure sensing apparatus can regulate the pressure. Unfortunately, in this conventional system, there is no method to detect damage to the ends of duct 27. Damage to duct 27 can induce problems in precisely regulating the flow rate of the chemical solution 36. In addition, the accumulation of helium gas can also over-pressurize the container 32. This over-pressurization usually causes the chemical solution 36 to be imprecisely supplied.

SUMMARY OF THE INVENTION

It is therefore an objective of the present invention to provide a pressure sensing apparatus which includes a vent hole. The vent hole allows the accumulated gas pressure to vent so that over-pressurization can be avoided. The precision of the pressure sensing apparatus of the invention, therefore, is not affected by the bubble size of the gas, and the flow rate can be easily regulated in normal operations. Furthermore, venting the extra gas can also avoid a reaction between the gas and a liquid in the container, such as the degeneration or crystallization of the liquid.

It is another objective of the present invention to provide a pressure sensing apparatus including a sensor for detecting whether or not the pressure of the chemical solution is kept at a relative constant level, thus ensuring that the flow rate is precisely regulated.

In accordance with the foregoing and other objectives of the present invention, the pressure sensing apparatus includes a vent hole for venting internal gas, a container containing a liquid and a gas and four extruding ports. The first extruding port is used for receiving the liquid. The second extruding port is used for exporting the liquid. The third extruding port is used for releasing the gas. The fourth extruding port is used for measuring the pressure.

BRIEF DESCRIPTION OF DRAWINGS

The invention can be more fully understood by reading the following detailed description of the preferred embodiment, with reference made to the accompanying drawings as follows.

DETAILED DESCRIPTION OF PREFERRED EMBODIMENT

Figure 3A:
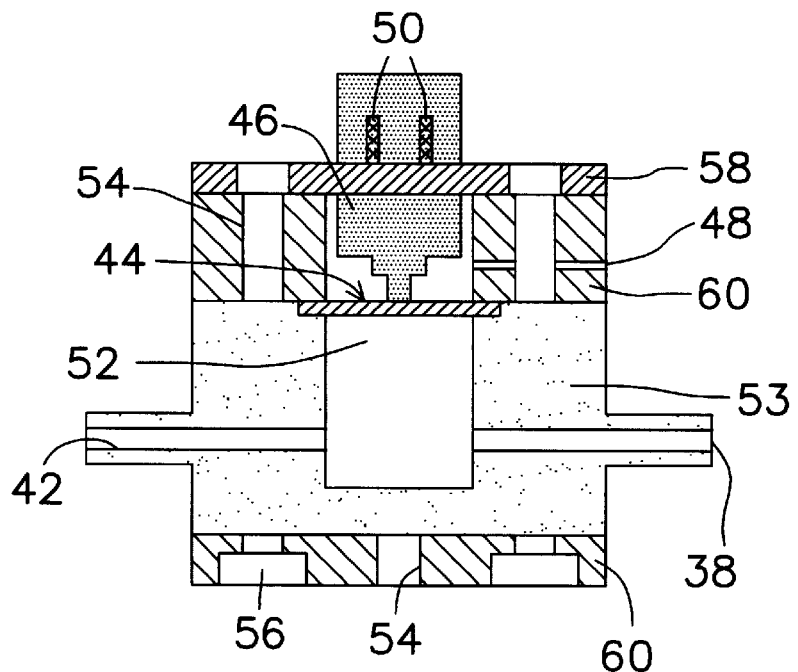
FIGS. 3A–3C are schematic plots of a pressure sensing apparatus in a cross sectional view, a side view and a top view, respectively, according to the preferred embodiment of the invention.
Figure 3B:
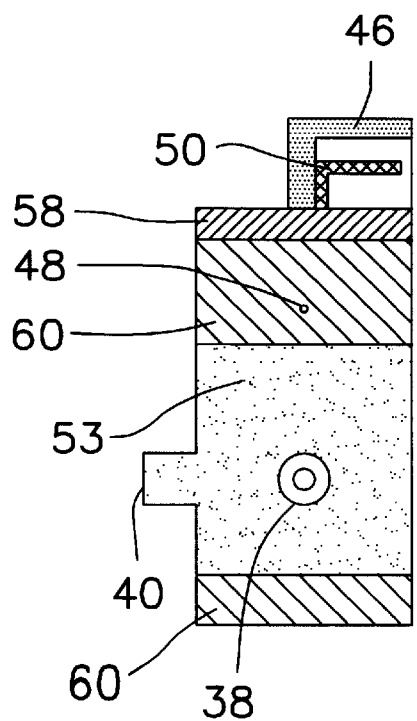
Figure 3C:
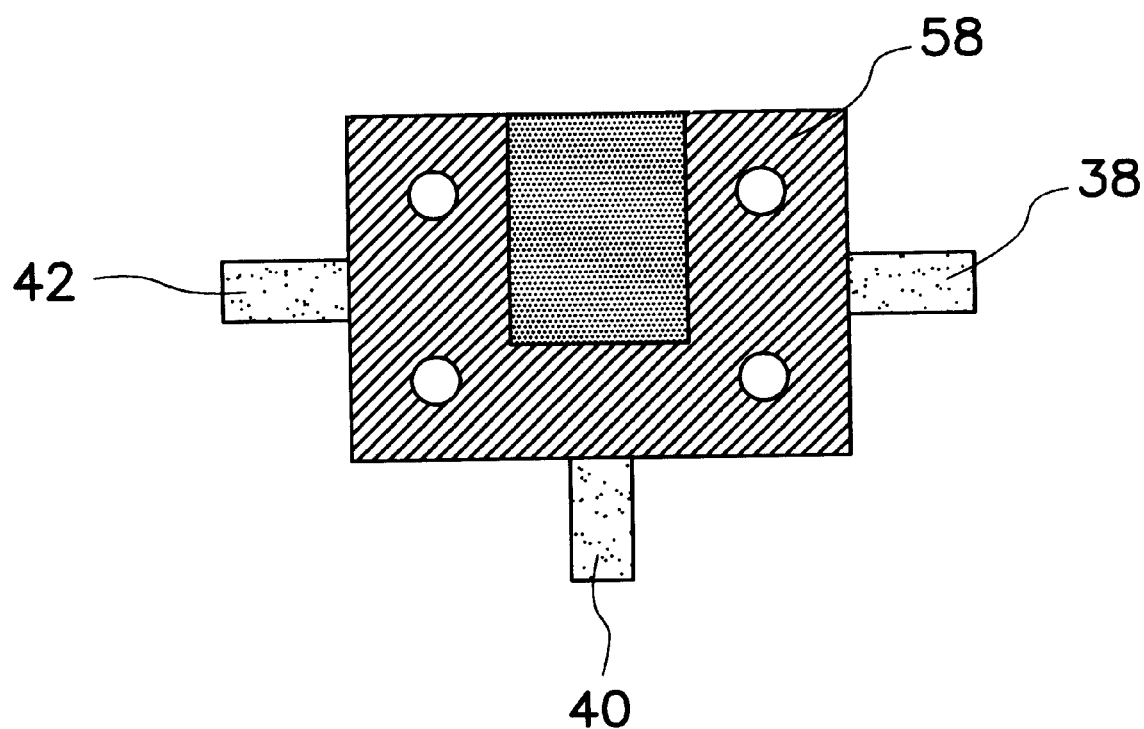

FIGS. 3A–3C are schematics of a pressure sensing apparatus in a cross sectional view, a side view and a top view, respectively, according to the preferred embodiment of the invention.

Figure 1A:
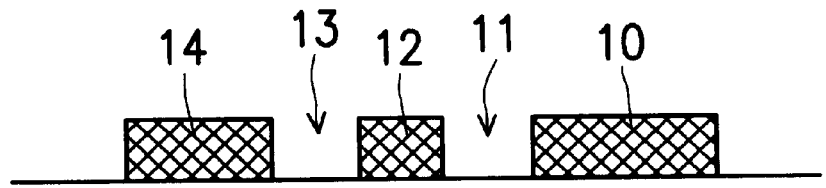
FIGS. 1A–1C are diagrams schematically illustrating a typical planarization process on a semiconductor substrate.
Figure 1B:
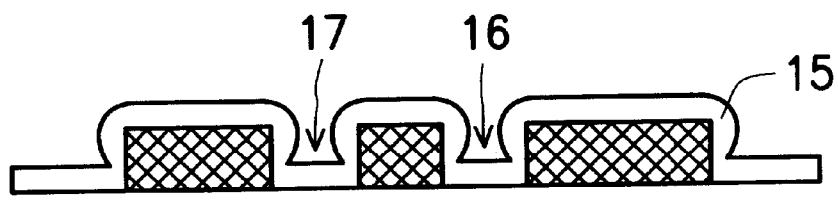
Figure 1C:
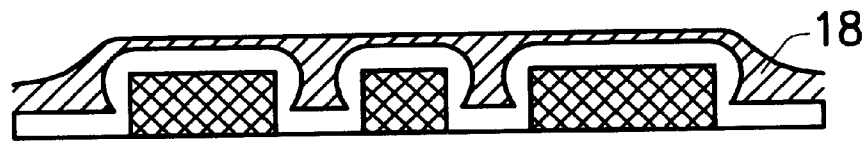
Figure 2:
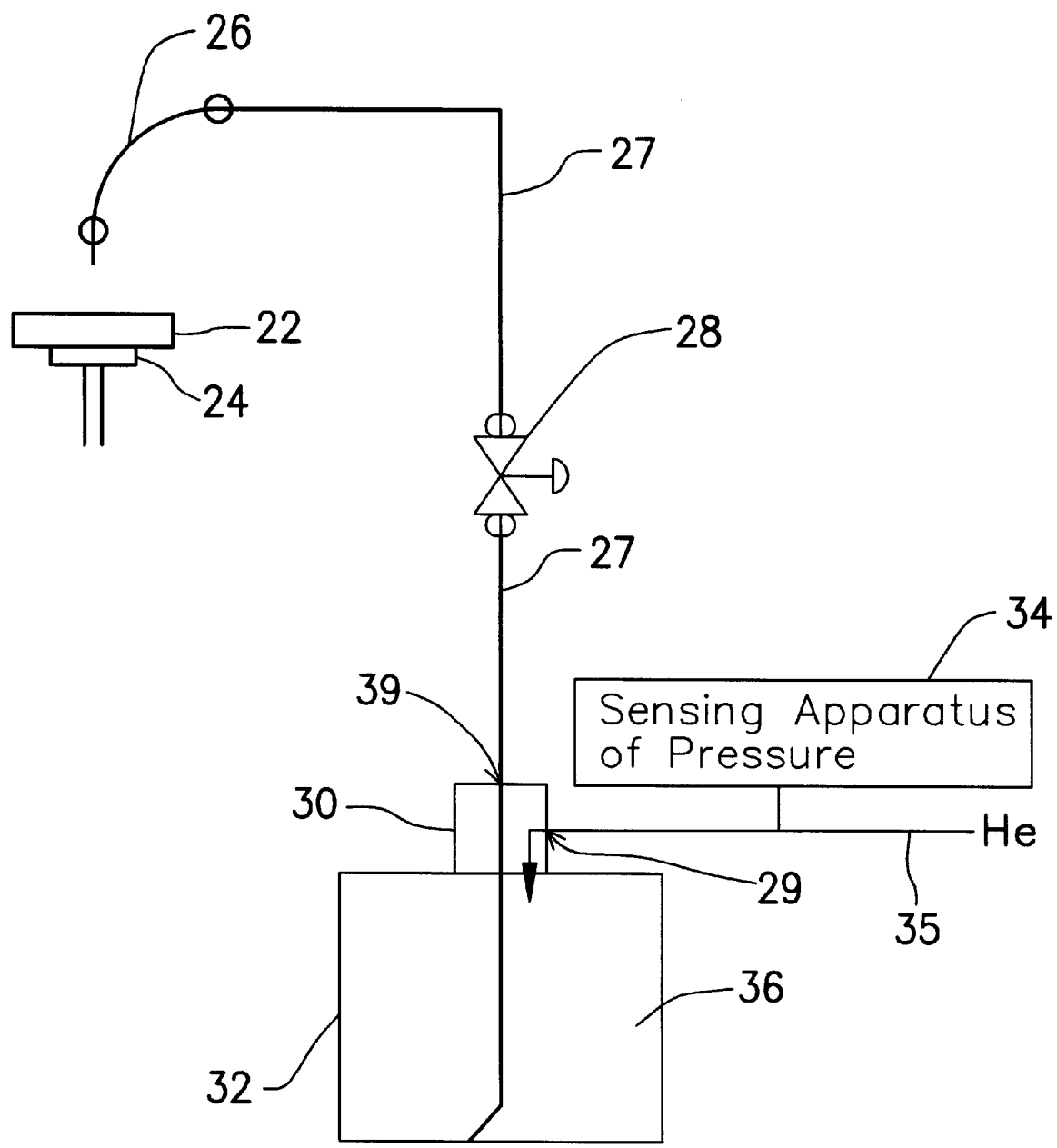
FIG. 2 is a plot schematically illustrating a conventional system of controlling the pressure of a flowing liquid.
Figure 5:
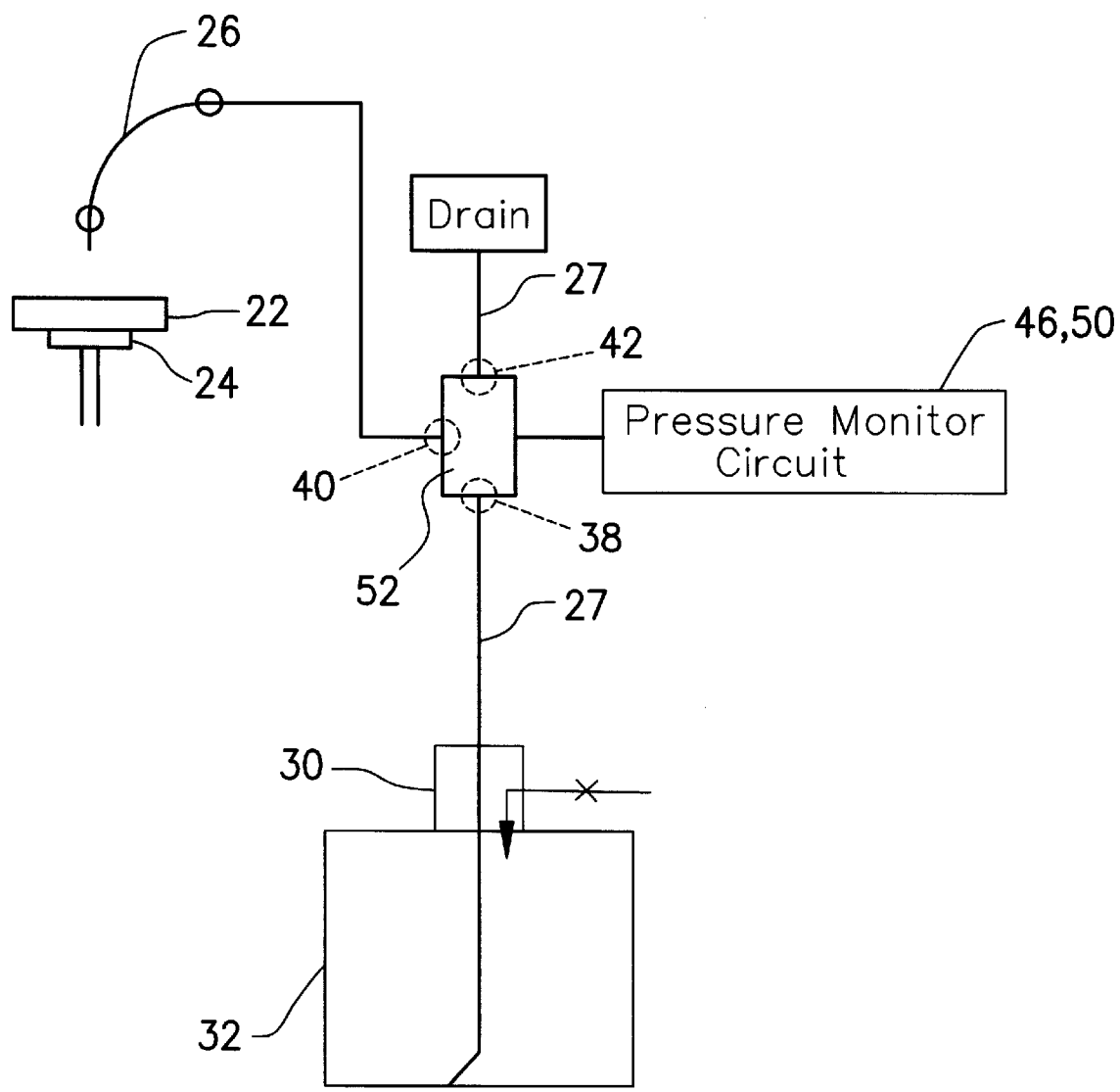
FIG. 5 is a system diagram, schematically illustrating the application of the pressure sensing apparatus in a solution transportation system used by a planarization process, according to an embodiment of the invention.

Referring to FIG. 3C, the pressure sensing apparatus has three extruding ports: a first extruding port 38, a second extruding port 40 and a third extruding port 42. Referring to FIG. 3A and FIG. 3C, the first extruding port 38 and the third extruding port 42 appear in the FIG. 3A, but the second extruding port 40 does not. Extruding port 40 runs through a container 52 but is not shown in FIG. 3A. Referring to FIG. 3B, the first extruding port 38 is not visible but a vent hole 48 for venting gas is shown. Referring to FIG. 3A and FIG. 3B, the container 52 is formed of a Teflon outer shell 53 containing a liquid with a low viscosity such as a SOG solution. The container 52 is connected to the first extruding port 38, which is used for receiving the solution, the second extruding port 40 which is used for exporting the solution, and the third extruding port 42 which is used for releasing the gas. The first extruding port 38, for example, is coupled to a main solution container, such as the container 32 of FIG. 2. The pressure sensing apparatus can be, for example, used in a planarization process in semiconductor fabrication as also shown in FIG. 5, in which the objects with the same reference number as the those in FIG. 2 are the similar objects.

The container 52 further includes a fourth port, a fourth opening, used for measuring the pressure. The fourth opening is composed of a diaphragm 44, a micro-switch 46, and an electrical output terminal 50. The diaphragm 44 closes the fourth opening to form a close space and is used to detect an internal pressure of the container 52 by varying its position due to pressure force. The micro-switch 46 is attached to the diaphragm 44 for switching the operation modes. The electrical output terminal 50 is connected to the micro-switch 46 and produces an electrical signal which varies with the internal pressure of container 52. If the internal pressure is out of allowed tolerances, the third extruding port 42 is used to release the gas inside container 52, thus adjusting the internal pressure. The fluid communication inside and outside the container 52 through the third extruding port 42 therefore can be established or cut off by opening or closing the third extruding port 42 so as to obtain a proper driving force on the liquid.

A vent hole 48 is used for venting accumulated gas to avoid over-pressurization, in which the accumulated gas is the extra gas accumulated in the fourth port of the container 52 at the upper side of the diaphragm 44. If there is no vent hole 48, when the diaphragm 44 is pushed up due to the internal pressure, the accumulated gas is pressurized also. The accumulated gas is contained by a space inside the fourth port between the diaphragm 44, sidewall 55 and a cover 58, which seals the fourth port from the very end of the sidewall 55. Without the vent hole 48, the pressurized accumulated gas produces a force on the diaphragm 44 in opposite direction, resulting in a poor sensitivity on the internal pressure of the container 52. The container 52 may be over-pressurized and a dispensing rate of the liquid is affected. In other words, the vent hole 48 can assure the pressure sensitivity of the diaphragm 44 by venting the gas accumulated at the upper side of the diaphragm 44 in the fourth port. The other parts of the sensing apparatus are typical, and include a number of screws 56 and threaded screw holes 54, a sustaining holder 60 and the cover 58. These conventional parts function in an industry standard fashion, and there is no need for detailed descriptions of them here.

Figure 4A:
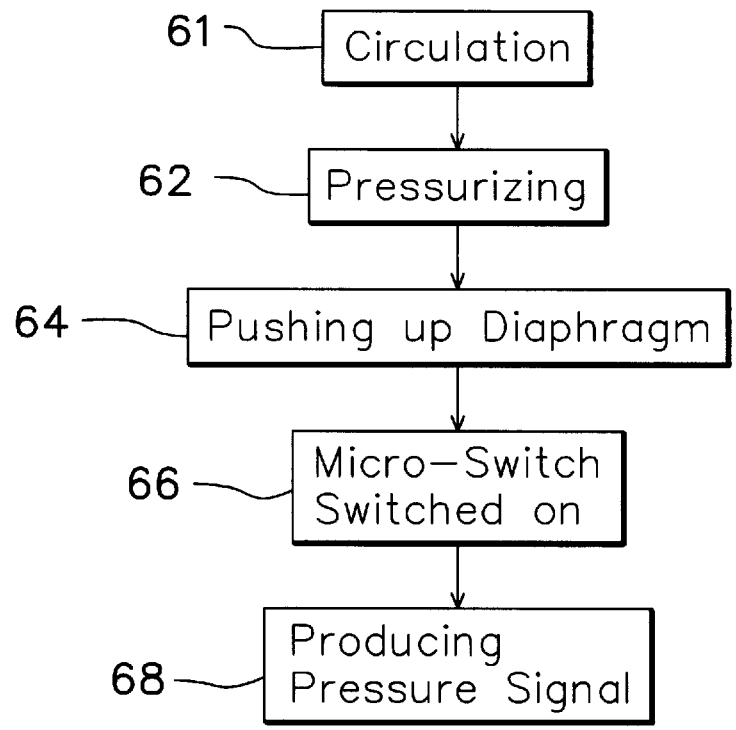
FIG. 4A and FIG. 4B are flow diagrams schematically illustrating the performing stages for controlling the transportation of a liquid, according to the preferred embodiment of the invention.
Figure 4B:
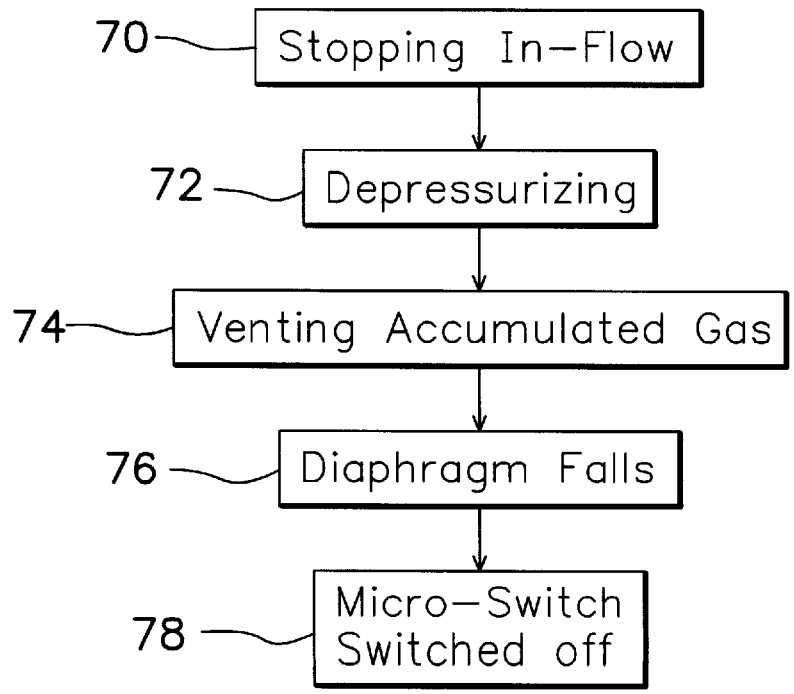

FIG. 4A and FIG. 4B are flow diagrams schematically illustrating the stages of regulating the flow of the liquid, according to the preferred embodiment of the invention.

Referring to FIG. 3A and FIG. 4A, the circulation stage 61 involves moving the liquid into container 52 through the first port 38 and then moving the liquid out through the second port 40, such that the liquid begins circulating. The next stage of pressurizing 62 results naturally if the rate of in-flow is larger than the rate of out-flow. Stage 64, pushing up the diaphragm, results from the filling of container 52. In the next stage, 66, the micro-switch 46 is switched on, triggered by the movement of attached diaphragm 44 in the previous stage. Finally in stage 68, producing pressure signal, an electrical signal is generated by electric output terminal 50. This signal provides precise pressure information to the operator.

Referring to FIG. 3A and FIG. 4B, a stage of stopping in-flow 70 consists of cutting off the in-flow of liquid into the container 52. The next stage of depressurizing 72 results naturally when the liquid is no-longer flowing into container 52. Next, a stage of venting accumulated gas 74 vents the accumulated, pressurized helium gas through the vent hole 48. As the internal pressure falls, the diaphragm drops as well, resulting in stage 76, diaphragm falls. The pressure steadily drops until the diaphragm 44 returns to its original position. When diaphragm 44 returns to its original position and is no longer moving, a signal from the micro-switch 46 at stage 78 is no longer produced because the diaphragm 44 stops moving. The micro-switch 46 is then off. As a result of this, there is no pressure signal produced from the electrical output terminal 50.

In conclusion, the invention provides a pressure sensing apparatus for transporting a liquid, which is characterized by being able to precisely control the pressure for circulating the liquid.

The apparatus uses a vent hole 48 to avoid pressure sensing precision bias due to bubble size inside the container 52. The vent hole 48 for venting extra gas out can also avoid a reaction between the gas and the liquid in the container 52 such as degeneration or crystallization of the liquid.

The apparatus uses a sensor for detecting the internal pressure so that the internal pressure of the container 52 can be kept in a relatively constant range.

The invention has been described using an exemplary preferred embodiment. However, it is to be understood that the scope of the invention is not limited to the disclosed embodiment. On the contrary, it is intended to cover various modifications and similar arrangements. The scope of the claims, therefore, should be accorded the broadest interpretation so as to encompass all such modifications and similar arrangements.

What is claimed is:

1. A pressure sensing apparatus, comprising:
   a container for containing a gas and a liquid wherein the gas is used to drive the liquid into the container and may enter the container;
   a first opening end on the container for receiving the liquid;
   a second opening end on the container for exporting the liquid;
   a third opening end on the container for releasing the gas so as to adjust an internal pressure of the container;
   a fourth opening end coupled to the container for measuring the internal pressure of the container, wherein the fourth opening further comprises:
   a diaphragm inside the fourth opening end for closing the container and sensing the internal pressure of the container below the diaphragm by its varying position relative to an original position due to the internal pressure;

a micro-switch attached to the diaphragm for a switching function, in which the micro-switch is moving together with the diaphragm to produce a pressure detection signal;

an electrical output terminal connected to the micro-switch for converting the pressure detection signal into an electrical signal and exporting the electrical signal out;

a cover, sealing the fourth opening end but allowing the micro-switch and the electrical output terminal to communicate with an outside environment; and a vent hole for venting an accumulated gas inside the fourth opening end between the diaphragm and the corer as the diaphragm is pushed up by the internal pressure, in which the vent hole is located between the diaphragm and the cover and punches through the fourth opening end, wherein when the liquid flows into the container and increases the internal pressure, the diaphragm is pushed up, thus switching the micro-switch to produce the pressure detection signal, which is converted into the electrical signal and sent out by the electrical output terminal.

2. The apparatus of claim 1, wherein the container is formed by a Teflon material.

3. The apparatus of claim 1, wherein the gas is used to drive the liquid into the container and includes helium.

4. The apparatus of claim 1, wherein the liquid includes a spin-on glass (SOG) liquid of low viscosity.

5. A pressure sensing apparatus able to contain a gas and a liquid, the apparatus comprising:

a container with an opening end for containing the gas and the liquid and having an internal pressure, wherein the gas is used to drive the liquid to flow into the container and may enter into the container;

a first port on the container for receiving the liquid;

a second port on the container for exporting the liquid;

a third port on the container for releasing the gas;

a diaphragm inside the opening end for separating the container into a first space and a second space, in which the first space includes the first, the second and the third ports so as to contain the liquid and the gas for liquid transportation, wherein the diaphragm detects an internal pressure of the container in the first space by smoothly moving its position relative to an original position due to the internal pressure;

a micro-switch attached to the diaphragm for a switching function, in which the micro-switch is moving together with the diaphragm to produce a pressure detection signal;

an electrical output terminal connected to the micro-switch for converting the pressure detection signal into an electrical signal and exporting the electrical signal out;

a cover, sealing the opening end of the container from the second space but allowing the micro-switch and the electrical output terminal to communicate with an outside environment; and a vent hole used for venting an accumulated gas inside the second space as the diaphragm is pushed up by the internal pressure, in which the vent hole punches through the container at the opening end to communicate with the second space, wherein when the liquid flows into the container and increases the internal pressure, the diaphragm is pushed up, thus switching the micro-switch on to produce the pressure detection signal, which is converted into the electrical signal and sent out by the electrical output terminal.

6. The apparatus of claim 5, wherein the container is formed by a Teflon material.

7. The apparatus of claim 5, wherein the gas includes helium.

8. The apparatus of claim 5, wherein the liquid includes a spin-on glass (SOG) liquid of low viscosity.

* * * * *